United States Patent [19]

Hasegawa

[11] Patent Number: 4,818,860
[45] Date of Patent: Apr. 4, 1989

[54] LIGHT COLLIMATING MEMBER FOR PHOTOELECTRIC TRANSFER APPARATUS

[75] Inventor: Kazuo Hasegawa, Furukawa, Japan

[73] Assignee: Alps Electric Co., Ltd., Japan

[21] Appl. No.: 81,832

[22] Filed: Aug. 5, 1987

[30] Foreign Application Priority Data

Sep. 22, 1986 [JP] Japan .............................. 61-222158
Oct. 21, 1986 [JP] Japan ........................ 61-160085[U]
Nov. 10, 1986 [JP] Japan ........................ 61-171286[U]
Jan. 30, 1987 [JP] Japan .......................... 62-11489[U]

[51] Int. Cl.[4] ............................................. G02B 6/04
[52] U.S. Cl. ................................. 250/227; 350/96.24; 350/276 SL
[58] Field of Search ................. 250/227, 505.1, 221; 350/319, 276 R, 276 SL, 96.18, 96.25, 96.27, 96.24; 313/372, 478

[56] References Cited

U.S. PATENT DOCUMENTS

| | | | |
|---|---|---|---|
| 3,253,500 | 5/1966 | Hicks, Jr. ..................... | 350/276 SL |
| 3,574,582 | 4/1971 | Siegmund et al. ........... | 350/276 SL |
| 3,712,986 | 1/1973 | Collings ...................... | 350/96.29 |
| 3,714,447 | 1/1973 | Jallais .......................... | 250/227 |
| 3,836,809 | 9/1974 | Condon ....................... | 350/96.29 |
| 4,615,583 | 10/1986 | Tsuno et al. .................. | 350/96.29 |

Primary Examiner—Edward P. Westin
Attorney, Agent, or Firm—Guy W. Shoup; Paul J. Winters; Edel M. Young

[57] ABSTRACT

A light conducting member for use in photoelectric transfer apparatus is disclosed comprising a large number of optical fibers bundled into an integral body, wherein each optical fiber is constituted of a transparent core and a light absorbing clad covering over the periphery of the core, and wherein the core and the clad have indexes of refraction virtually equal to each other.

4 Claims, 4 Drawing Sheets

LIGHT COLLIMATING MEMBER FOR PHOTOELECTRIC TRANSFER APPARATUS

BACKGROUND OF THE INVENTION

1. Field of the Invention

The present invention relates to light conducting members having the functions to conduct only beams of light straightly advancing in the direction of a desired optical axis and photoelectric transfer apparatus using such a light conducting member.

1. Description of the Prior Art

As one of the prior arts, such an arrangement in which a light conducting member formed of a bundle of a large number of optical fibers each thereof having a core and clad disposed in front of a photoelectric transfer apparatus is disclosed in U.S. Pat. No. 3,714,447.

In optical apparatus such as photosensor apparatus and optical instruments, there are provided various optical systems.

Figure 15:
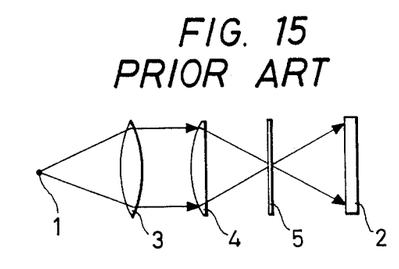
FIGS. 15 to 21 are drawings showing prior art examples.

In optical reading apparatus such as, for example, bar code scanners and facsimile apparatus, there is provided, as is known, such an optical system as shown in FIG. 15, in which an objective lens 3, a condenser lens 4, and a pinhole 5 are each disposed at predetermined spaces apart between a pattern 1 as a material to be read and a photodetector device 2. In this case, after a point light source from the pattern 1 is turned into parallel rays through the objective lens 3, only these parallel rays are converged by the condenser lens 4 to form the image in the pinhole 5 and be read by the photodetector device 2.

Figure 16:
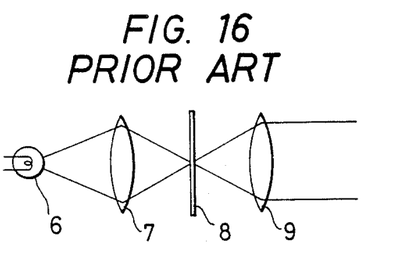

In floodlights or the like, it is known that such an optical system as shown in FIG. 16 is provided, in which a condenser lens 7, a pinhole 8 and a collimator lens 9 are each disposed at predetermined spaces apart backwardly of a light source 6. In this case, only parallel rays out of the divergent rays from the light source 6 are converged by the condenser lens 7 to effect image formation in the pinhole 8 and then turned into parallel rays by the collimator lens 9.

There are various types of coordinate input apparatus for inputting coordinates manually in a computer such as those of the electromagnetic type, capacitance type, transparent electrode type, and the photo-detection type. Out of these, what is receiving attention from viewpoints of reliability and operability is that of the photo-detection type, which can be fitted in front of a display apparatus and is adapted such that light paths formed therein are shielded by the finger or the like merely placed on any position on the display surface of the display apparatus, and thereby, the coordinates of that position can be specified without a touch on the detection apparatus itself.

Figures 17, 18:
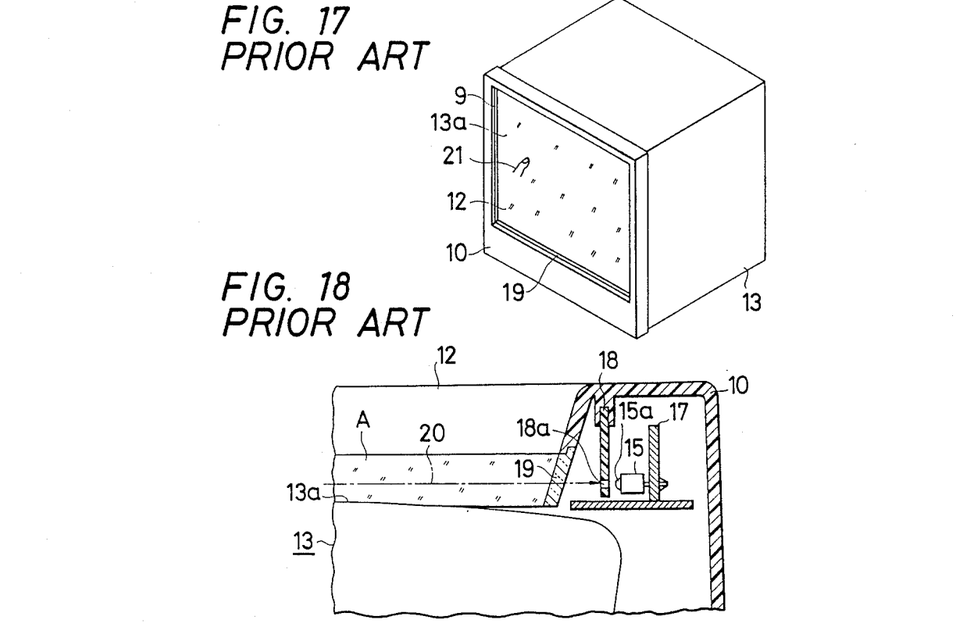
Figure 19:
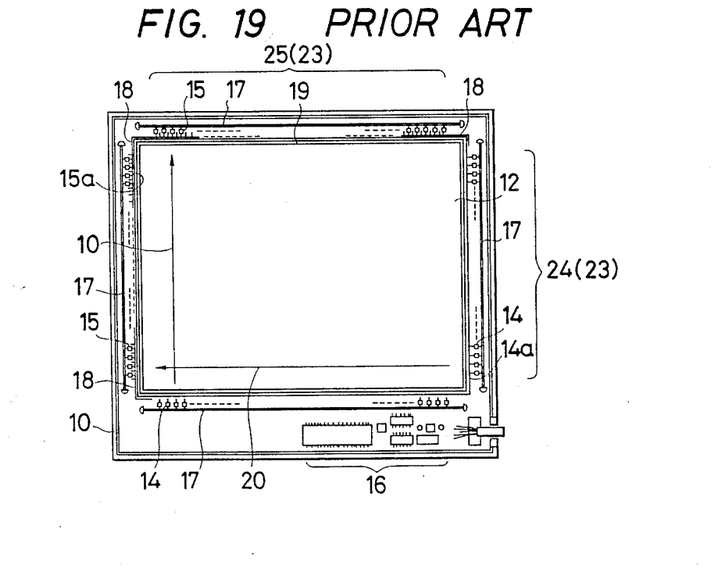

An example of the photo-detection type of the prior art coordinate input apparatus is shown in FIG. 17 to FIG. 19. FIG. 17 is a perspective view showing a state of the coordinate input apparatus mounted in front of a display apparatus, FIG. 18 is a sectional view of the important portion of the coordinate input apparatus at the side toward photodetector devices, and FIG. 19 is a rear view of the coordinate input apparatus with its back board removed so that its internal arrangement may be seen.

In these figures, the coordinate input apparatus is chiefly made up of a frame body 10 shaped into a virtually rectangular form with an opening 12 made in the center portion thereof, numbers of photo emitting devices 14 such as LEDs and numbers of photodetector devices 15 such as phototransistors each arranged in line in the space at the rear of the frame 10, i.e., the space between the frame 10 and the circumferential portion of the display surface 13a of a display apparatus 13 using a CRT (cathode ray tube) or the like, and a processing unit 16 for detecting the position of the shielded optical paths 20 out of all the optical paths 20 formed by combinations of the light emitting devices 14 and photodetector devices 15 situated to oppose each other through the operating area A in front of the display surface 13a and inputting the detected position, the lines of light emitting devices 24 and the lines of photodetector devices 25 forming two sets of opposite sides of a frame formed by the lines of such optical devices 23.

The light emitting devices 14 and the photodetector devices 15 are fixed on a board 17 provided within the frame body 10 so that the light emitting portion 14a and photodetecting portion 15a of each set of them may oppose each other, and further, in front of the photodetecting portion 15a of the photodetector device 15, there is disposed a shield plate 18 with a light inlet opening 18a of a predetermined area made therein so that only the light beam incident from the light emitting device 14 which is the pair of the photodetector device 15 may be received therethrough. Further, in front of such shield plates 18 and the light emitting devices 14, i.e., at the circumference of the operating area A, there is set up an infrared filter 19 along the entire circumference. Therefore, in the operating area A in front of the display surface 13a, there are formed invisible light paths 20 through the infrared filter 19.

The inputting principle of the coordinate input apparatus of the above described construction will now be explained. Supposing that the finger 21 is placed in touch with the display surface 13a at the position desired to be input as shown in FIG. 17, the light paths 20 which are to go over that position are shielded by the finger and the coordinates of the position can thus be specified. More particularly, it is adapted such that the shielded paths 20 in both x and y directions are detected by the photodetector devices 15 by successively lighting, or scanning, the light emitting devices 14 of the lines of light emitting devices 24, and these paths 20 are specified by the processing unit 16 and the coordinate values thereof are input to a host computer not shown.

As examples of the prior art optical reading apparatus for optically reading recorded images such as a bar code provided on a material to be read, there are disclosed bar code reading arrangements in the publication of Japanese Laid-open Utility Model No. 54-170,735, the publication of U.S. Pat. No. 3,809,893 etc.

Such bar code scanner will be described with reference to FIG. 20, in which 26 denotes a body in a virtually cylindrical form as a whole except the front portion in a cone form, 27 denotes a retainer disposed within the body 26, and 28 denotes a light beam path 28 provided bored in the center of the retainer 27 extending in the axial direction. Reference numeral 29 denotes a light emitting device such as a light emitting diode attached to the front end of the retainer 27, 30 denotes a lens disposed at one end of the light beam path 28, 31 denotes a photodetector device such as a phototransistor disposed at the other end of the light beam path 28, and 32 denotes a pinhole disposed in front of the photodetector device 31, and the photodetector device 31 is connected to a print board (not shown) with various electronic parts for processing circuits mounted thereon.

In reading a bar code printed on a material to be read 33 with the bar code scanner briefly described above as to its construction, the light beam from the light emitting device 29 is thrown on the material to be read 33. Then, the reflected light from the material to be read 33 is converged through the lens 30 to form the image in the pinhole 32, and then allowed to enter the photodetector device 31. By processing the output signal from the photodetector device 31, the bar code can be read out.

OBJECTS AND SUMMARY OF THE INVENTION

In the cases where the optical apparatus as shown in FIGS. 15 and 16 are used, it is at times required that the apparatus have a collimating function, i.e., the function to cut off the rays of light incident thereto obliquely to the optical axis and only allow parallel rays to pass therethrough. However, since such function has been provided by combining a plurality of optical devices such as lenses and pinhole in the prior art optical systems, there have been such problems that the systems become complex in structure by the use of the plurality of optical devices and become larger in the dimension in the axial direction because certain spaces are required between such optical devices.

Accordingly, an object of the present invention is to overcome the above mentioned problem of the prior art and to provide a light conducting member formed of short optical fibers allowing only those rays parallel to the optical axis to pass therethrough.

In the cases where the prior art apparatus as shown in FIGS. 17 to 19 are used, although there is provided the light inlet opening 18a of a predetermined area in front of the photodetecting portion 15a of each photodetector device 15, it is difficult to secure the directivity of the light beam from the light emitting device 14 to the corresponding photodetector device 15 only by the provision of the light inlet opening 18a, which has a certain area so as not to impair the detection efficiency. As a result, there have been possibilities of malfunction to be caused by undesired beams of light. Included in the undesired beams of light are, for example, those proceeding out of the light paths 20 being reflected from the interior wall of the infrared filter 19 at its virtually central portion to reach the photodetecting portion 15a of the photodetector device 15 and external disturbance light obliquely incident to the input operating area. Especially, strong disturbance light such as flashlight of a camera or the sunlight reaching the photodetecting portion 15a have sometimes damaged the photodetector device 15.

Accordingly, another object of the present invention is to overcome the above mentioned problem of the prior art and to provide an optical coordinate input apparatus provided with improved directivity and completely prevented from causing malfunction.

Figure 20:
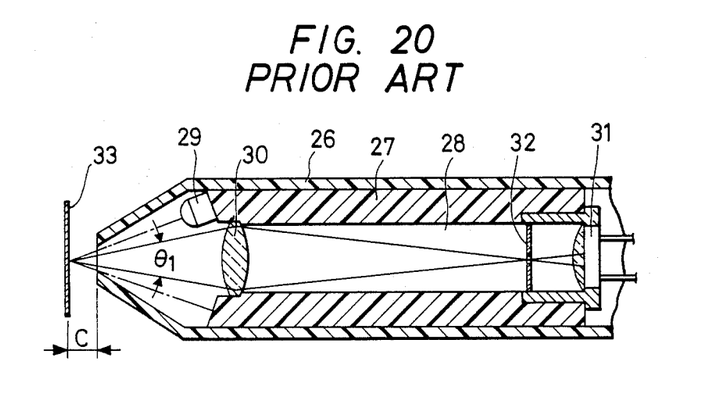
Figure 21:
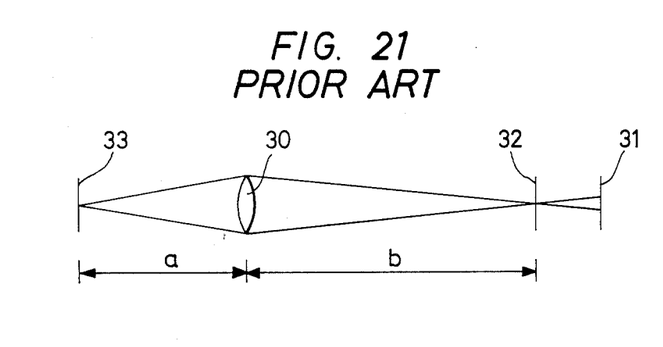

In the prior art bar code scanners as shown in FIGS. 20 and 21, since such an optical system is used in which the reflected light is formed into the image in the pinhole 32, there has been such a problem that the bar code scanner becomes large in size, specifically, in the direction of the optical axis of the lens 30. The reason for that will be explained with reference to FIG. 21.

FIG. 21 is an explanatory drawing of the optical system in the above described bar code scanner, in which a represents the distance from the material to be read 33 to the lens 30 and b represents the distance from the lens 30 to the pinhole 32. In order to deepen the focal depth in such an optical system wherein the angle of opening from one point on the material to be read 33 to the lens 30 is $\theta_1$, and to suppress variations in the beam spot diameter on the bar code due to changes in the distance c shown in FIG. 21, it is preferred that the light paths from the material to be read 33 to the lens 30 are as parallel to one another as possible, i.e., that the dimension a is as large as possible. And, in order to improve the resolution in the reading, it is required to make the hole diameter of the pinhole 32 sufficiently small compared with the spot diameter on the bar code. To attain that, b/a must be larger than 1, i.e., the dimension b must be larger than the dimension a. For such reasons, in the prior art examples as described above, the optical system from the material to be read 33 to the photodetector device 31 is lengthened in the direction of the optical axis, and therefore, there has been a problem that the bar code scanner cannot be made shorter. What has been described above is also applicable to the case where the bar code scanner is place obliquely to the material to be read 33.

Besides, since the pinhole 32 has to be accurately aligned with the optical axis of the lens 30 in the above described prior art example, there has been a problem that the assembling work becomes complex.

Accordingly, a further object of the present invention is to overcome the above mentioned problems and to provide an optical reading apparatus which is simpler in assemblage as well as smaller in size.

In order to attain the above enumerated objects, the light conducting member of the present invention is structured of a large number of optical fibers bundled into an integral body, each of the optical fibers being constituted of a transparent core and a light absorbing clad covering over the periphery of the core and the core and the clad having indexes of refraction virtually equal to each other.

According to the present invention, if the optical fibers bundled as above is placed, for example, opposite to a light source, the rays oblique to the optical axis, out of divergent rays from the light source, are cut off by being absorbed by the clad portion and the rays parallel to the optical axis are transmitted through the core portion, and therefore, only the rays advancing straightly are allowed to pass through the optical fibers being short in the axial direction.

BRIEF DESCRIPTION OF THE DRAWINGS

FIGS. 1 to 4 are related to an embodiment of a light conducting member according to the present invention, in which

FIGS. 5 to 7 are related to an embodiment of an optical coordinate input apparatus, in which

FIGS. 8 to 10 are related to a first embodiment of a bar code scanner, in which

FIGS. 11 to 14 are related to a second embodiment of a bar code scanner, in which

DESCRIPTION OF THE PREFERRED EMBODIMENTS

Figure 1:
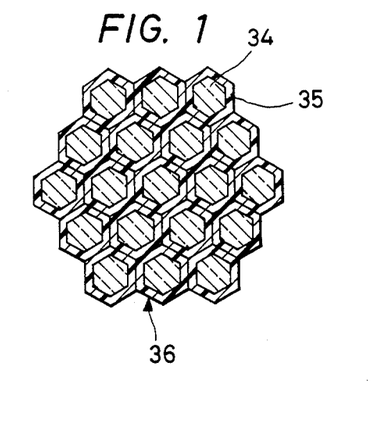
FIG. 1 is a sectional view of the light conducting member.
Figure 2:
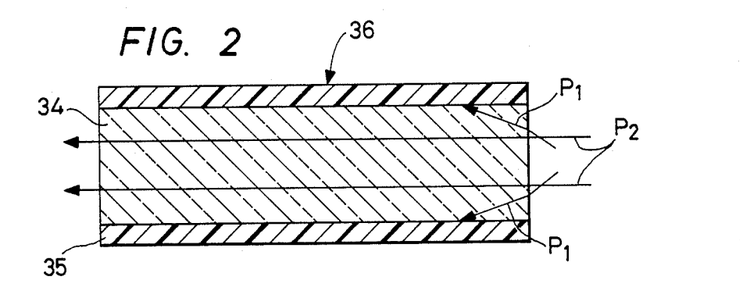
FIG. 2 is a sectional view in the direction of the optical axis of an optical fiber constituting the light conducting member.

FIG. 1 is a front view of a light conducting member according to an embodiment of the present invention and FIG. 2 is an explanatory drawing of the optical fiber constituting the light conducting member.

The light conducting member according to the present invention as shown in FIG. 1 is formed of a large number of optical fibers 36 bundled into an integral body. The optical fiber 36 is, as shown in FIG. 2, constituted of a core 34 made from a transparent material as clear glass and a clad 35 made from a light absorbing material as black glass covering the core 34, in which the indexes of refraction of the core 34 and the clad 35 are virtually equal. Therefore, if random rays of light are introduced into the light conducting member from its one end, then, as shown in FIG. 2, those rays obliquely incident to the optical axis, $P_1$, are absorbed by the clad portion 35 having a high light absorbing property and only those rays incident parallel to the optical axis, $P_2$, are transmitted through the transparent core portion 34 and allowed to reach the other end.

Figure 3:
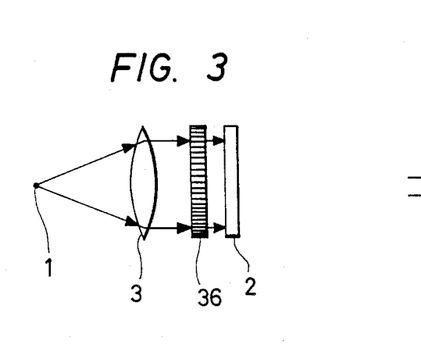
FIG. 3 is a drawing showing construction of an optical system employing the light conducting member.
Figure 4:
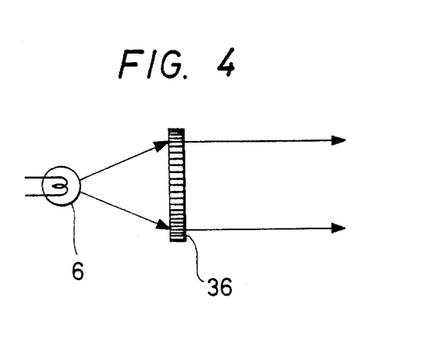
FIG. 4 is a drawing showing construction of another optical system employing the light conducting member.

FIGS. 3 and 4 show concrete examples of such light conducting members applied to optical systems of optical apparatus, in which that shown in FIG. 3 corresponds to the optical system of FIG. 15 and that shown in FIG. 4 corresponds to the optical system of FIG. 16.

That is, in the optical system shown in FIG. 3, the point light source from the pattern 1 is turned into parallel rays of light by means of the objective lens 3 and then only those rays parallel to the optical axis of the light conducting member formed of a collection of the optical fibers 36 are selectively allowed to pass therethrough to reach the photodetector device 2, whereby the condenser lens 4 and the pinhole 5 which were required in the optical system of FIG. 15 have been replaced with the light conducting member (optical fibers) 36 and, at the same time, the distance between the objective lens 3 and the photodetector device 2 has been greatly reduced.

In the optical system as shown in FIG. 4, out of divergent rays from the light source 6, only those rays parallel to the optical axis are selectively passed through the light conducting member (optical fibers) 36, and, also in this case, the condenser lens 7, pinhole 8, and the collimator lens 9 which were required in the optical system of FIG. 16 have been replaced with the light conducting member and, at the same time, the distance from the light source 6 to the position where parallel rays of light are obtained has been greatly reduced.

Since the light conducting member according to the present invention is formed of a large number of optical fibers bundled into an integral body, it is easy to handle and the same effects can be obtained when it is applied to other optical systems than those described above. Further, since the present optical fiber can be manufactured by a method basically similar to that for manufacturing the known optical fibers for optical communications (formed of a transparent core covered by a clad whose index of refraction is smaller than that of the core), it is advantageous in terms of cost of manufacture over the prior art light detecting apparatus organized by some combination of a plurality of optical devices.

An embodiment of an optical coordinate input apparatus employing the light conducting member of the present invention will now be described with reference to FIGS. 5 to 7.

Figure 5:
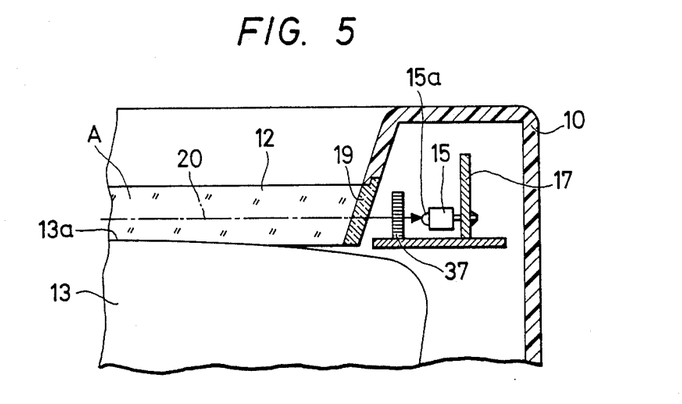
FIG. 5 is a sectional view of the important portion of the optical coordinate input apparatus at the side toward photodetector devices.
Figure 6:
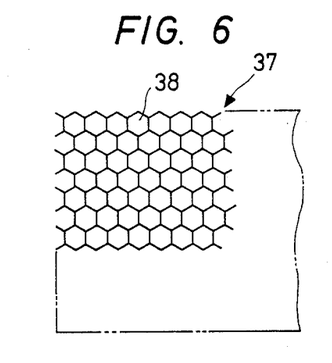
FIG. 6 is an enlarged plan view showing the light conducting member used in the optical coordinate input apparatus.
Figure 7:
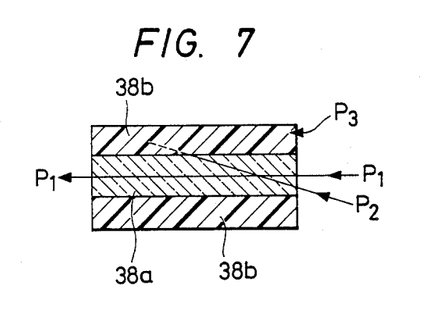
FIG. 7 is a sectional view in the direction of the optical axis of an optical fiber constituting the light conducting member.

FIG. 5 is a sectional view of the important portion of the optical coordinate input apparatus at the side toward the photodetector devices, FIG. 6 is an enlarged plan view of the light conducting member used for the same, and FIG. 7 is an explanatory drawing of an optical fiber constituting the light conducting member, in which corresponding parts to those in FIGS. 17 to 19 are denoted by like reference numerals.

In front of the photodetecting portions 15a of the photodetector devices 15, as shown in FIG. 5, there are disposed plate type light conducting members 37 corresponding to their respective photodetector devices 15 in line. The light conducting member 37 is formed of a large number of optical fibers 38 bundled into an integral body and disposed so that the optical path of each optical fiber 38 lies in parallel with the optical path 20. The optical fiber 38 is, as shown in FIG. 7, constituted of the core 38a made from a transparent material such as clear glass and the clad 38b made from a light absorbing material such as black glass covering the core 38a, in which the indexes of refraction of the core 38a and the clad 38b are adapted to be the same or approximately equal to each other. Therefore, if random rays of light advancing in various directions are introduced into the light conducting member 37 from one end thereof, the portion of the rays advancing parallel or virtually parallel to the optical axis of the optical fiber 38, $P_1$, reaches the other end propagating through the core portion 38a, while the beams of light $P_2$ and $P_3$ which are incident at larger angles than a certain small angle with respect to the optical axis are absorbed by the clad portion 38b.

As apparent from the above explanation, the rays of light introduced from the side of the operating area A along the optical path 20 which is formed between a pair of light emitting device and photodetector device 15 reach the photodetecting portion 15a of the photodetector device 15 passing through the infrared filter 19 and the core portion 38a of the light conducting member 37, but the rays of light incident at an angle with the optical path 20 are absorbed by the clad portion 38b of the light conducting member 37 and usable to reach the photodetecting portion 15a. Therefore, undesired incident light such has that emitted from the light emitting device and reflected from the internal wall of the infrared filter 19 or external disturbance light such as flashlight or the sunlight incident at an angle from above is absorbed by the light conducting member 37 and unreachable to the photodetector device 15. Thus, only the light incident through the optical path 20 is reachable to the photodetector device 15 and thereby the directivity is greatly improved.

Now, a first embodiment of a bar code scanner employing the light conducting member will be described with reference to FIGS. 1 and 2 and FIGS. 8 to 10.

Figure 8:
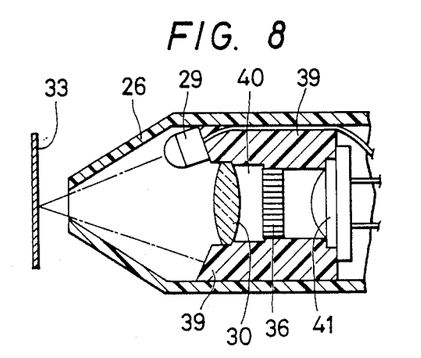
FIG. 8 is a sectional view of the important portion of the bar code scanner.
Figure 9:
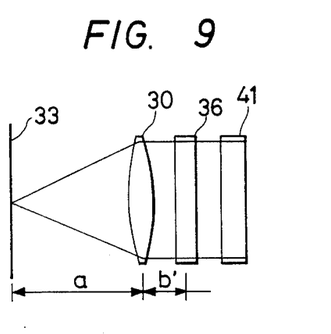
FIG. 9 is an explanatory drawing of the optical system in the bar code scanner.

FIG. 8 is a sectional view of the important portion of the bar code scanner according to the present embodiment, FIG. 1 is an enlarged front view of the light conducting member to be provided for the bar code scanner, FIG. 2 is a side view of the optical fiber constituting the light conducting member, and FIG. 9 is an explanatory drawing of the optical path in the bar code scanner, in which corresponding parts or positions to those in FIG. 20 are denoted by like reference numerals.

In the case of the bar code scanner according to the present embodiment, as shown in FIG. 8, there is disposed the light conducting member 36 in the light beam path 40 within the retaining member 39 instead of the conventional pinhole, whereby the distance between the lens 30 and the photodetector device 41 is greatly reduced.

The light conducting member 36 is formed of a large number of optical fibers 34+35 parallel to the optical path bundled into an integral body, in which each optical fiber 34+35 is different in its constitution from the existing one being used for optical communications or the like. That is, as shown in FIGS. 1 and 2, the optical fiber 34+35 is formed of the core 34 made from a transparent material such as clear glass having a uniform index of refraction and the clad 35, as a light absorbing member, made from a transparent material having virtually the same index of refraction as the core 34 with a light absorbing material mixed therein, covering over the periphery of the core 34. And, both end faces of the core 34 and the clad 35 are provided with highly smooth finishing. Therefore, if random rays of light including parallel rays are introduced from one end of the light conducting member 36, the rays of light parallel to or virtually parallel to the optical axis, $P_1$, reach the other end through the transparent core portion 34, while the rays of light incident at a predetermined angle $\theta$ or larger, $P_2$, are cut off being absorbed by the clad portion 35 having a high light absorbing property. Incidentally, the above mentioned angle $\theta$ is determined depending upon the diameter and the length of the core 34 and set up between 0.3 to 1° in the present embodiment.

In reading the bar code printed on the material to be read 33 with the described bar code scanner, the light emitting device 29 is lighted so that the light beam is thrown on the bar code and the reflected light is introduced through the lens 30 and the light conducting member 36 into the photodetector device 41. Since, at this time, the light conducting member 36 has a collimating function as described above, only the rays of light parallel to the optical axis (or virtually parallel rays proceeding within the above described angle $\theta$) out of those passed through the lens 30 reach the photodetector device 41, but the rays of light entering the light conducting member 36 out of the optical path shown in FIG. 9 are absorbed by the clad portion 35 of the light conducting member 36 and unreachable to the photodetector device 41. In other words, only the point light source from the bar code 33 at the focal point of the lens 30 can reach the photodetector device 41, and thus, a bar code scanner having high resolution in reading can be realized.

Since the present embodiment utilizes the collimating function of the light conducting member 36, the distance between the lens 30 and the photodetector device 41 can be greatly reduced from that in the prior art bar code scanner employing a pinhole.

Further, since the light conducting member 36 is formed of a large number of optical fibers 34+35 bundled into an integral body, no further positioning cares are required if the light conducting member has been positioned so as to be square with the optical axis of the lens 30. Thus, the assembling work becomes very easier than in the prior art case where high accuracy was required for alignment of the pinhole with the optical axis.

Figure 10:
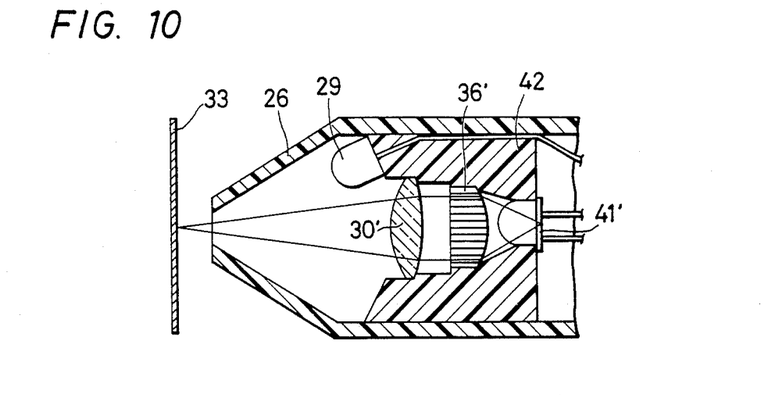
FIG. 10 is a sectional view of the important portion of a bar code scanner according to a variation of the embodiment of FIG. 8.

FIG. 10 is a sectional view of the important portion of a variation of the bar code scanner according to the present embodiment, in which corresponding parts to those in FIG. 8 are denoted by like reference numerals.

In this variation, the light conducting member 36' is provided with a flat surface on the side toward the lens 30' and with a convex surface on the side toward the photodetector device 41', and both the surfaces are provided with highly smooth finishing. Therefore, desired rays of light (those virtually parallel to the optical axis) to enter the photodetector device 41' passing through the core portion 34 of the light conducting member 36' are refracted to converge at the convex surface of the core portion 34. As a result, a smaller photodetector device 41' than that in the embodiment described in FIG. 8 can be used.

Concerning the finished conditions on both the end faces of the light conducting member 36' in each embodiment described above, the surface on the side toward the lens 30' (entering side) must be finished in highly smooth surface with especially high precision. This is because, if the end face of the light conducting member 36' on the side toward the lens 30' is of low smoothness, then the incident light is refracted at the end face and the collimating function is impaired to invite such undesirable results that the parallel rays of light which should originally pass through the light conducting member 36' will be absorbed by the clad portion 35 or undesired rays of light will pass through the core portion 34 to enter the photodetector device 41'. As to the end face of the light conducting member 36' on the side toward the photodetector device 41' (emerging side), even if its surface smoothness is somewhat inferior and therefore the emerging rays of light are refracted at the end face so that their optical paths reaching the photodetector device 41' are deflected to a certain degree, the desired rays of light which have passed through the light conducting member 36' are correctly received by the photodetector device 41' because it has a certain area of its light receiving surface.

A second embodiment of the bar code scanner employing the light conducting member will be described below in detail with reference to FIG. 1 and FIGS. 11 to 14.

Figure 11:
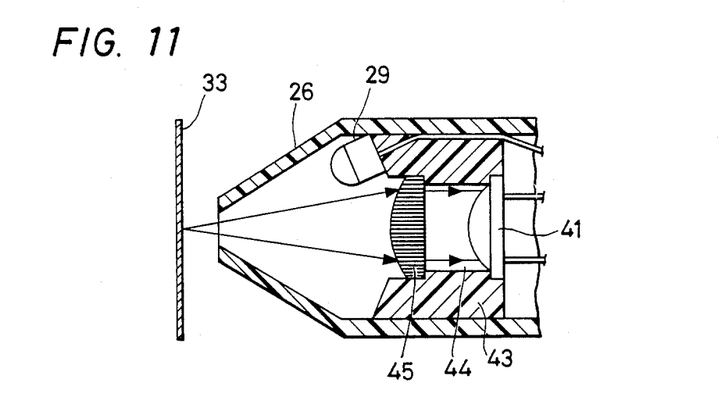
FIG. 11 is a sectional view of the important portion of the bar code scanner.
Figure 12:
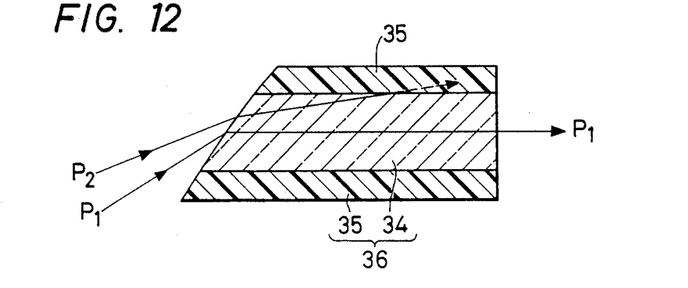
FIG. 12 is a sectional view in the direction of the light axis of an optical fiber constituting the light conducting member for the bar code scanner.

FIG. 11 is a sectional view of the important portion of the bar code scanner according to the present embodiment, FIG. 1 is an enlarged front view showing the light conducting member provided for the bar code scanner, and FIG. 12 is a side view of an optical fiber constituting the light conducting member, in which corresponding parts and positions to those described above with reference to FIG. 20 are denoted by like reference numerals.

In the case of the bar code scanner according to the present embodiment, as shown in FIG. 11, there is disposed a light conducting member 45 with a convex surface provided on its front side (entering side) in the light beam path 44 within the retaining member 43 instead of the conventional lens and pinhole. And, the material to be read 33 is disposed opposite to the light conducting member 45 at its focal point.

The light conducting member 45 is formed of a large number of optical fibers 36 in parallel with the optical axis bundled into an integral body, each optical fiber being different in constitution from the existing one used for optical communications or the like. That is, as shown in FIG. 1, the optical fiber 36 is constituted of the core 34 made from a transparent material such as clear glass having a uniform index of refraction and the clad 35, as a light absorbing member, covering over the peripheral surface of the core 34, made from a transparent material having virtually the same index of refraction as the core 34 with a light absorbing material mixed therein. And, both the end faces of the core 34 and the clad 35, formed in a convex surface and a flat surface, are provided with highly smooth finishing. Therefore, if random rays of light are introduced from the front side of the light conducting member 45, the rays of light passing the focal point of the light conducting member 45, $P_1$, reach the other end proceeding through the transparent core portion 34 in parallel therewith after being refracted at the convex surface of the light conducting member 45, while the rays of light incident at a predetermined angle $\theta$ or larger, $P_2$, with respect to the light $P_1$ are cut off being absorbed by the clad portion 35 having a high light absorbing property after being refracted by the convex surface. Incidentally, the angle $\theta$ is determined depending upon the diameter and length of the core 34 and set up between 0.3 to 1° in the present embodiment.

In reading the bar code printed on the material to be read 33 with the described bar code scanner, the light emitting device 29 is lighted so that the light beam is thrown on the bar code and the reflected light is introduced through the light conducting member 45 into the photodetector device 41. Since, at this time, the light conducting member 45 has a collimating function as described above, only the rays of light reflected at the convex surface and made parallel to the optical axis (or virtually parallel, i.e., within the above described angle $\theta$) reach the photodetector device 41, but the other rays of light are absorbed by the clad portion 35 of the light conducting member 45 and unreachable to the photodetector device 41. In other words, only the point light source from the bar code at the focal point of the light conducting member 45 can reach the photodetector device 41, and thus, a bar code scanner having high resolution in reading can be realized.

Since the present embodiment utilizes the collimating function of the light conducting member 45, the distance from the material to be read 33 to the photodetector device 41 can be greatly reduced from the prior art bar code scanner employing a lens and a pinhole.

Further, since the light conducting member 45 is formed of a large number of optical fibers 36 bundled into an integral body, no further positioning cares are required if the light conducting member 45 has been positioned so as to be square with the optical axis. Thus, the assembling work becomes very easier than in the prior art case where high accuracy was required for alignment of the pinhole with the optical axis.

Figure 13:
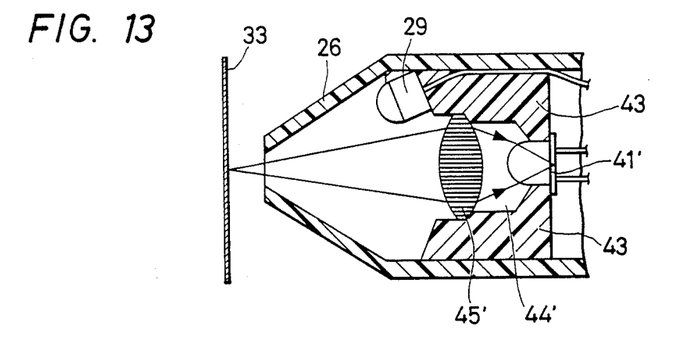
FIGS. 13 and 14 are sectional views showing the important portions of bar code scanners according to variations of the embodiment of FIG. 11.

FIG. 13 is a sectional view of the important portion of a variation of the bar code scanner according to the present invention, in which corresponding parts to those in FIG. 11 are denoted by like reference numerals.

In the case of this variation, both the front side (entering side) and the rear side (emerging side) of the light conducting member 45' are formed into a convex surface and provided with highly smooth finishing. Therefore, The rays of light emitted from the light emitting device 29 and reflected from the material 33 to be read located at the focal point of the light conducting member 45' are turned into parallel rays by being refracted by the convex surface on the front side of the light conducting member 45', advance through the core portion 34, and refracted by the convex surface on the rear side of the light conducting member 45' to be converged into the photodetector device, and therefore, a smaller photodetector device 41' than that used in the above described embodiment in FIG. 11 can be used.

Figure 14:
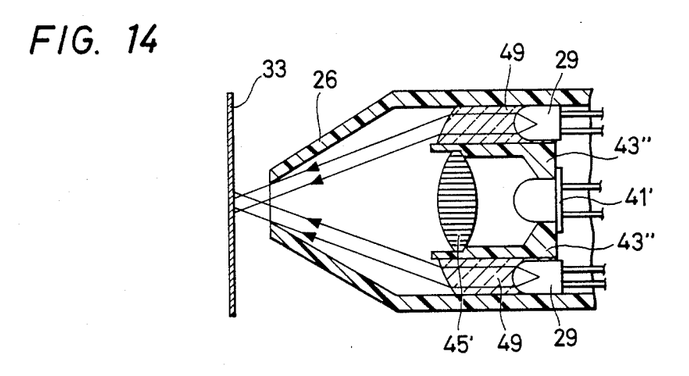

FIG. 14 shows still another variation of the present embodiment according to this invention, in which the construction is the same as in the embodiment shown in FIG. 13, except that a light transmitting member 49 made from acrylic resin or the like is disposed in front of the light emitting device 29. When the light beam from the light emitting device 29 is adapted to be thrown on the material to be read 33 by way of the light transmitting member 49, the degree of freedom in designing the arrangement of the light emitting device 29 is improved and the assembling work becomes easier, and also, divergence of the light beam from the light emitting device 29 is suppressed so that more uniform beam of light can be thrown on the material to be read 33.

According to the present invention as described so far, a light conducting member of simpler structure and smaller size can be provided by the use of optical fibers each thereof formed of a transparent core and a light absorbing clad covering the core, whose indexes of refraction being virtually equal to each other, since by using them it is enabled to selectively pass therethrough only those rays of light proceeding parallel to the optical axis.

And, since the light directly advancing from the light emitting device to the photodetector device can reach the photodetecting portion passing through the core portion of the light conducting member disposed therebetween, while the light incident at an angle with the optical path is absorbed and cut off by the clad portion of the light conducting member, only the light advancing in a specific direction can be selectively received for detection, i.e., the directivity is greatly improved. Thus, according to the present invention, an optical coordinate input apparatus which is free from malfunction and highly reliable can be provided, since only the incident light through the optical paths formed between pairs of the light emitting device and photodetector device are selectively received and the undesired light such as external disturbance light incident at an angle with the optical path can be absorbed by the light conducting member.

Further, the light conducting member of the present invention allows the ray of light parallel or virtually parallel to the optical axis to be conducted therethrough and those oblique to the optical axis to be absorbed and cut off by the clad portion. Therefore, when the light conducting member having such a collimating function is disposed between a lens and a photodetector device in an optical reading apparatus, only the light reflected from a material to be read positioned at the focal point of the lens can reach the photodetector device passing through the light conducting member, and as a result, the distance between the lens and the photodetector device can be made much shorter than that in the prior art case using a pinhole. Thus, an optical reading apparatus of smaller size and easier for assembling can be provided, because the distance between the lens and the photodetector device can be greatly reduced with a high resolving power maintained by the use of the light conducting member having such a collimating function.

Furthermore, since only the rays of light reflected from a material to be read positioned at the focal point of the light conducting member are, when the front side thereof is provided with a convex surface, enabled to reach the photodetector device passing through the core portion of the light conducting member after being refracted by the convex surface on the front side of the light conducting member, and other rays of light are absorbed by the clad portion of the light conducting member, the distance from the material to be read to the photodetector device can be made much smaller than that in the prior art case using a lens and a pinhole and a construction without the lens and pinhole is made possible. Thus, an optical reading apparatus of simpler construction and smaller size can be provided, since the distance from the material to be read to the photodetector device can be greatly reduced with a high resolving power maintained by the use of the light conducting member having such a collimating function.

Although the embodiments described hereinabove have been those of optical coordinate input apparatus, bar code scanners, or the like, the present invention can of course be applicable to optical encoders, picture image reading apparatus, and others.

What is claimed is:

1. A light conducting member in combination with a photodetector device capable of conversion between light and an electrical signal, said light conducting member being disposed in front of said photodetector device and comprising a large number of optical fibers bundled into an integral body wherein each optical fiber is constituted of a transparent core and a light absorbing clad covering over the periphery of said core, and wherein said core and said clad have indexes of refraction virtually equal to each other.

2. A light conducting member for photoelectric transfer apparatus according to claim 1, wherein the end faces of said core and said clad are provided with highly smooth finishing.

3. A light conducting member for photoelectric transfer apparatus according to claim 1, wherein the end face of said light conducting member is finished in a curved surface.

4. A light conducting member in combination with a light emitting device, said light conducting member comprising a large number of optical fibers bundled into an integral body wherein each optical fiber is constituted of a transparent core and a light absorbing clad covering over the periphery of said core, and wherein said core and said clad have indexes of refraction virtually equal to each other, said light conducting member being disposed in front of said light emitting device.

* * * * *